United States Patent
Grumbine

(10) Patent No.: US 7,087,187 B2
(45) Date of Patent: Aug. 8, 2006

(54) META OXIDE COATED CARBON BLACK FOR CMP

(76) Inventor: Steven K. Grumbine, 2523 Crestview Dr., Aurora, IL (US) 60504

( * ) Notice: Subject to any disclaimer, the term of this patent is extended or adjusted under 35 U.S.C. 154(b) by 136 days.

(21) Appl. No.: 10/164,916

(22) Filed: Jun. 6, 2002

(65) Prior Publication Data

US 2003/0226998 A1  Dec. 11, 2003

(51) Int. Cl.
*C09K 13/00* (2006.01)

(52) U.S. Cl. .................... 252/79.1; 438/692

(58) Field of Classification Search ........ 438/692, 438/693; 216/89; 252/79.1; 51/307, 308, 51/309; 516/38
See application file for complete search history.

(56) References Cited

U.S. PATENT DOCUMENTS

| | | | |
|---|---|---|---|
| 5,338,353 A | 8/1994 | Uchino et al. | |
| 5,498,372 A * | 3/1996 | Hedges | 252/511 |
| 5,527,423 A | 6/1996 | Neville et al. | |
| 5,783,489 A | 7/1998 | Kaufman et al. | |
| 5,919,855 A * | 7/1999 | Reed et al. | 524/496 |
| 5,954,997 A | 9/1999 | Kaufman et al. | |
| 6,063,306 A | 5/2000 | Kaufman et al. | |
| 6,197,274 B1 * | 3/2001 | Mahmud et al. | 423/449.2 |
| 6,258,137 B1 | 7/2001 | Garg et al. | |
| 6,312,321 B1 * | 11/2001 | Fukushima et al. | 451/285 |
| 6,387,531 B1 * | 5/2002 | Bi et al. | 428/570 |
| 6,439,965 B1 * | 8/2002 | Ichino et al. | 451/36 |
| 6,610,114 B1 * | 8/2003 | Towery et al. | 513/308 |
| 6,623,787 B1 * | 9/2003 | Bowers et al. | 427/58 |
| 2001/0034197 A1 * | 10/2001 | Dudovicz | 451/168 |
| 2003/0003857 A1 * | 1/2003 | Shimagaki et al. | 451/534 |

FOREIGN PATENT DOCUMENTS

WO  WO 01/12741  2/2001

* cited by examiner

*Primary Examiner*—Kin-Chan Chen
(74) *Attorney, Agent, or Firm*—Alison J. Baldwin; Blair Huighes

(57) ABSTRACT

Using coated carbon black particles, coated with a selected coating material, as an abrasive in slurries or polishing pads for chemical-mechanical polishing processes. By adjusting the coating material on the carbon black particles, new abrasive particles for chemical-mechanical polishing are created with tailored performance properties.

8 Claims, No Drawings

META OXIDE COATED CARBON BLACK FOR CMP

FIELD OF THE INVENTION

The present invention relates to the field of chemical mechanical polishing and, more particularly, to abrasive particles used in the chemical mechanical polishing processes and compositions.

BACKGROUND

Chemical Mechanical Polishing (CMP) is the process of smoothing and/or planarizing a substrate surface by chemical and mechanical forces. The basic CMP process consists of moving a substrate surface to be polished against a pad that is used to provide support against the substrate surface and to carry a slurry between the sample surface and pad to affect the polishing. The slurry may provide both chemical action through the solution chemistry and mechanical action through an abrasive. Abrasive particles in a slurry cause mechanical damage on the sample surface, loosening the material for enhanced chemical attack by the solution chemistry or fracturing off pieces of the substrate surface into a slurry where they dissolve or are swept away.

The choice of polishing dispersion or slurry is an important factor in the CMP process. CMP is used on a wide variety of substrate materials and these different substrates have different chemical and mechanical requirements for polishing. For example, mechanical effects are important, for hard materials or non-reactive like Pt and Ta. For soft materials like Cu and polymers, chemical effects may be more important. Furthermore, a polycrystalline film may require different chemistry compared to amorphous or single crystalline films due to enhanced chemical action at the grain boundaries or at a given grain orientation High polishing rates, planarity, selectivity, uniformity, post-CMP ease of cleaning, shelf life, and dispersion ability are factors considered to optimize the polishing composition performance. These factors are affected by many variables in the CMP process, including the abrasive particles used in the CMP slurry or in the polishing pad, which play an important role in transferring mechanical energy to the surface being polished. In current CMP dispersions, the ability to get the right mix of particle hardiness, surface chemistry, size, morphology, etc. is difficult to obtain.

Commonly used abrasive particles include silica, alumina, and cerium oxides. Each of these abrasive particles exhibits specific advantageous and disadvantageous characteristics for use in a CMP slurry. For example, cerium oxides have the advantage of being chemically reactive; therefore, it contributes to both the chemical and mechanical forces of the slurry. However, cerium oxide particles are dense, which makes it difficult to make colloidally stable. Apart from their specific characteristics, each of these commonly used abrasive particles is limited in the size and morphology achievable for the particle when it is used alone in the CMP slurry.

Additionally, other materials, such as carbon black, are being investigated as abrasives for CMP slurries. Carbon black molecules have some advantageous characteristics for use in CMP, such as being chemically neutral, which allows it to be used on a variety of substrates and in a wide variety of chemical environments. However, carbon black also has dispersability and stability disadvantages. Additionally, carbon black tends to adhere to surfaces being polished and is difficult to clean off of the polished surfaces.

Therefore, there is a need for abrasive particles that can be specifically designed to maximize the specific characteristics needed for CMP processes. There is a need for abrasive particles that can be specifically designed to optimize the slurry performance for the specific CMP process in which they are utilized.

SUMMARY OF THE INVENTION

The present invention relates to a chemical-mechanical polishing slurry comprising abrasive particles dispersed in an aqueous medium wherein the abrasive particles are carbon black coated with a coating material.

The present invention also relates to a method for chemical-mechanical polishing comprising the steps of providing a chemical mechanical polishing slurry comprising abrasive particles dispersed in an aqueous medium wherein the abrasive particles are carbon black coated with a coating material; bringing a substrate in contact with the slurry; and removing a portion of the substrate.

The present invention also relates to a polishing pad for use in CMP comprising abrasive particles fixed in or on the polishing pad wherein the abrasive particles are carbon black coated with a coating material.

Additionally, the present invention relates to a method for chemical-mechanical polishing comprising of the steps of: providing a polishing pad having abrasive particles fixed in or on the polishing pad wherein the abrasive particles are carbon black coated with a coating material; bringing a substrate in contact with the polishing pad; and removing a portion of the substrate.

DETAILED DESCRIPTION

In the present invention, carbon black is used as a template for creating new abrasive particles with tailored performance properties for CMP. Aggregates of carbon black are coated with a selected coating material, thereby creating a new and useful aggregate having a carbon black core and an outer surface comprising the coating material. These coated carbon black aggregates are then utilized as abrasive particles in slurry or in a pad for use in CMP.

As discussed previously, carbon black has many disadvantageous properties that limit its usefulness as an abrasive particle in CMP processes. However, carbon black is an ideal core material for creating new coated abrasive particles. For example, carbon black exhibits very low chemical reactivity, which is important for carbon blacks usefulness as a core because different coating materials require a different pH for coating onto the carbon black and/or for stability in the slurry. Carbon black's low reactivity allows it to be utilized over a wide pH range in CMP processes.

Additionally, by coating the carbon black, many of the disadvantageous properties of the carbon black are minimized or eliminated. For example, the coating on the carbon black fills in some of the sharper edges of the carbon black aggregates, thereby reducing the possibility of the carbon black scratching the substrate surface during the CMP process. Coating the carbon black can also improve the cleanability of the carbon black and can improve the colloidal stability of the carbon black.

Carbon blacks are generally produced in a furnace-type reactor by pyrolyzing a hydrocarbon feedstock with hot combustion gases to produce combustion products containing particulate carbon black. These carbon black particles then form aggregates of carbon black. The carbon black is then coated with a coating material to form coated carbon black aggregates.

Possible coating materials for use in the present invention include, but are not limited to, metal oxides, such as silicum oxides ($SiO_x$), cerium oxides ($CeO_x$), titanium oxides ($TiO_x$), and zirconium oxides ($ZrO_x$), aluminum oxides ($AlO_x$), germanium oxides ($GeO_x$), and mixtures thereof. The coating materials may be coated onto the carbon black using methods known to those skilled in the art. For example, the carbon black may be coated during the process used to create the metal oxide particles, such as solgel, hydrothermal processes, or precipitation processes.

Examples of coating methods contemplated by the present invention include, but are not limited to, those methods described in U.S. Pat. Nos. 6,197,274 B1, 6,258,137, 5,338,353 and EP 1,020,488, incorporated herein by reference. Preferably, at least 10% of the carbon black surface is covered by the coating material. The size of the final coated carbon black aggregates is, preferably, less than 10μ and, most preferably, less than 1μ.

The choice of technique for producing the metal oxide particles for coating the carbon black will partially depend upon the morphology of the metal oxide desired to coat the carbon black. For example, precipitated metal oxides may be manufactured by conventional techniques such as by precipitation of the desired particles from an aqueous medium under the influence of high salt concentrations, acids or other coagulants. This technique creates metal oxide particles, which adhere to the surface of the carbon black aggregates present. This technique may create additional small metal oxide particles (e.g. spherical) which do not adhere to the carbon black.

Preferably, the coated carbon black will have a surface area, as calculated from the method of S. Brunauer, P. H. Emmet and I. Teller, J. Am. Chemical Society, Volume 60, page 309 (1938) and commonly referred to as BET. The original surface area of the carbon black will typically be reduced by 10–50% or more after coating with the coating material.

The selection of the coating material is based upon the specific performance properties needed for the CMP application in which the coated carbon black will be utilized. Properties such as particle hardiness, surface chemistry, size, morphology, selectivity, dispersability and/or chemical reactivity can be tailored to the needs of the CMP application by manipulating the material coating the carbon black particles. For example, coated carbon blacks have sizes and shapes that aren't accessible in the coating materials by themselves. By coating these materials onto the carbon black, different morphologies and, subsequently, different CMP regimes may be attainable that were not possible using the coating material alone as the abrasive particle.

Additionally, coating the coating material onto the carbon black can minimize or eliminate some of the disadvantageous characteristics of the coating material for use in CMP processes. For example, the lighter core of carbon black will reduce problems with the stability of heavier particles, such as ceria, in solution.

These coated carbon black particles are then incorporated as abrasive particles in a slurry or a polishing pad for use in CMP. When the coated carbon black is fixed (e.g. embedded), in whole or in part, in or on the polishing pad of the system, such fixation on the polishing pad can be accomplished in any suitable manner.

The coated carbon black particles of the present invention may be incorporated into a wide variety of CMP polishing compositions and slurries, such as those disclosed in U.S. Pat. Nos. 6,068,787, 6,063,306, 6,033,596, 6,039,891, 6,015,506, 5,954,997, 5,993,686, 5,783,489, 5,244,523, 5,209,816, 5,340,370, 4,789,648, 5,391,258, 5,476,606, 5,527,423, 5,354,490, 5,157,876, 5,137,544, 4,956,313, WO 01 127 40, and WO 01 127 41, the specifications of each of which are incorporated herein by reference. Typically, the non-abrasive components of the slurry are mixed into an aqueous medium, such as deionized or distilled water, at predetermined concentrations under low shear conditions until such components are completely dissolved in the medium. A concentrated dispersion of the coated carbon black particles is then added to the medium and diluted to the desired loading level of abrasive in the final CMP slurry. Preferably, CMP slurries will include from about 0.1 to about 20.0% (w/w) of coated carbon black particles. More preferably, the CMP slurry comprises about 0.1% to about 5.0% coated carbon black particles. Notably, while the total weight percentage of abrasive particles in the final slurry may be similar to previous CMP slurries, the weight percentage of primary particles of metal oxide is less because these particles have been coated onto the carbon black core particles.

In one aspect of the present invention, carbon black aggregates are coated with a silica oxide. The resulting silica-coated carbon black exhibits the aggregate morphology of carbon black, but more rounded because the silica particles fill in some of the rough edges of the carbon black aggregate. Additionally, the silica-coated carbon black exhibits the surface chemistry of silica. This surface chemistry is particularly useful in polishing silica-based substrates because polishing abrasives that are similar to the surface being polished tends to work best.

In another aspect of the present invention, carbon black aggregates are coated with ceria oxide. Preferably, at least 10–15% of the carbon black is coated with ceria oxide molecules. Ceria is a very dense material, having a molecular weight of 140.12. The high density of ceria makes it difficult to create a colloidally stable slurry. The ceria-coated carbon black particles have a lower density than that of normal ceria. Therefore, to ceria coated carbon black is more easily dispersed, i.e., there is increased uniformity of particles within the solution. Furthermore, using the ceria-coated carbon black as the abrasive in the slurry results in less defectivity on the surface of the substrate being polished because the low density and small particle size reduces the tendency for scratching and deforming of the substrate. By coating the ceria onto the carbon black, the resulting abrasive particle has the chemistry and reactivity of ceria without the problem associated with the high density of ceria.

A CMP slurry of the present invention may, optionally, contain one or more of additives known in the art, such as: oxidizing agents, complexing agents, film forming agents, inhibitors, stopping compounds, stabilizers, dispersants, polymeric compounds, organic acids, surfactants, Ph adjusters, or buffers. The additive may be added directly to the slurry or the metal oxide may be coated with an additive, such as polymers or surfactants, prior to coating the carbon black.

The oxidizing agent can be any suitable oxidizing agent. Suitable oxidizing agents include, for example, one or more per-compounds, which comprise at least one peroxy group (—O—O—). Suitable per-compounds include, for example, peroxides, persulfates (e.g., monopersulfates and dipersulfates), percarbonates, and acids thereof, and salts thereof, and mixtures thereof. Other suitable oxidizing agents include, for example, oxidized halides (e.g., chlorates, bromates, iodates, perchlorates, perbromates, periodates, and acids thereof, and mixtures thereof, and the like), perboric acid, perborates percarbonates, peroxyacids (e.g., peracetic acid, perbenzoic acid, m-chloroperbenzoic acid, salts thereof, mixtures thereof, and the like), permanganates, chromates, cerium compounds, ferricyanides (e.g., potassium ferricyanide), mixtures thereof, and the like. Preferred oxidizing agents include, for example, hydrogen peroxide, urea-hydrogen peroxide, sodium peroxide, benzyl peroxide, di-t-butyl peroxide, peracetic acid, monopersulfuric acid, dipersulfuric acid, iodic acid, and salts thereof, and mixtures thereof. Oxidizing agents are useful when incorporated into a CMP slurry to polish a metal or metal based substrate.

Film forming agents may be any compound or mixtures of compounds that are capable of facilitating the formation of a passivation layer of metal oxides and dissolution inhibiting layers on the surface of the metal layer. Passivation of the substrate surface layer is important to prevent wet etching of the substrate surface. Suitable passivation film-forming agents include, for example any compound, or mixture of compounds, that facilitate the formation of a passivation layer (i.e., a dissolution-inhibiting layer) on a metal layer and/or a metal oxide layer. Suitable passivation film-forming agents include, for example, nitrogen-containing heterocyclic compounds. Preferably, the passivation film-forming agent comprises one or more 5–6 member heterocyclic nitrogen-containing rings. More preferably, the passivation film-forming agent is selected from the group consisting of 1,2,3-triazole, 1,2,4-triazole, benzotriazole, benzimidazole, benzothiazole, and derivatives thereof, such as, for example, hydroxy-, amino-, carboxy-, mercapto-, nitro-, urea-, thiourea-, or alkyl-substituted derivatives thereof. Most preferably, the passivation film-forming agent is selected from the group consisting of benzotriazole (BTA), 1,2,3-triazole, 1,2,4-triazole, and mixtures thereof.

The system of the present invention also can comprise any suitable stopping compound. Suitable stopping compounds include, for example, any suitable compound that inhibits the ability of the system to polish at least a portion of one or more layers of a multi-layer substrate. The stopping compound can be any suitable cationically charged nitrogen-containing compound selected from the group of compounds comprising amines, imines, amides, imides, polymers thereof, and mixtures thereof. The term "cationically charged" as used herein means that a portion (e.g., about 5% or more, about 10% or more, about 15% or more, or about 20% or more) of the stopping compounds in the liquid portion of the system is in cationic form at the operating pH of the system of the present invention. Preferably, the stopping compound has a pKa value that is 1 or more units greater than the operating pH of the liquid portion of the system. For example, in a system with a pH of 6.5, preferred stopping compounds would have a pKa value of about 7.5 or more. Preferred stopping compounds also are oppositely charged from the surface charge of the second layer of the substrate layer. Suitable stopping compounds include, for example, compounds comprising primary amines, secondary amines, tertiary amines, quaternary amines (i.e., quaternary ammonium salts), etheramines, oligomeric amines, oligomeric imines, oligomeric amides, oligomeric imides, polymeric amines, polymeric imines, polymeric amides, polymeric imides, or mixtures thereof. Moreover, suitable stopping compounds include, for example, amino acids, amino alcohols, amino ether alcohols, or mixtures thereof. Preferred stopping compounds also include, for example, polyetheramines, polyethylenimines, $N_4$-amin (N,N'-bis-[3-aminopropyl]ethylene diamine), 4,7,10-trioxatridecane-1, 13-diamine, 3,3-dimethyl-4,4-diaminodicyclo-hexyl-methane, 2-phenylethylamine, N,N-dimethyldipropylenetriamine, 3-[2-methoxyethoxy]propylamine, dimethylaminopropylamine, 1,4-bis)3-amino propyl) piperazine, and mixtures thereof. In addition, preferred stopping compounds include, for example, isophorone diamine, hexamethylenediamine, cyclohexyl-1,3-propane diamine, thiomicamine, (aminopropyl)-1,3-propane diamine, tetra-ethylene-pentamine, tetramethylbutanediamine, propylamine, diaminopropanol, aminobutanol, (2-aminoethoxy) ethanol, or mixtures thereof.

Complexing agents include but are not limited to acids such as citric, lactic, tartaric, succinic, acetic, oxalic and other acids, as well as amino acid and amino sulfuric acids and their salts. The complexing agents may serve at least two useful functions: (1) disturbs the passivation layer during the mechanical abrasion step without destroying the layer or inhibiting its formation during the abrasion step and especially after the abrasion step is complete and (2) to form a complex with the oxidized metal and not the underlying unoxidized metal thereby limiting the depth of the oxidized layer.

Suitable polymeric compounds include, for example, any suitable polymeric compound that reduces the polishing rate of at least one layer associated with the substrate. Preferably, the system comprises at least one polymeric compound comprising a polyvinylalcohol, a polyethylene oxide, a polypropylen oxide, a sulfonic polymer, a sulfonate polymer, or a mixture thereof. Suitable pH adjusters, regulators or buffers include, for example, sodium hydroxide, sodium carbonate, sulfuric acid, hydrochloric acid, nitric acid, phosphoric acid, citric acid, potassium phosphate, mixtures thereof, and the like. Additionally, organic acids such as phosphoric, carbonic, mono-carboxylic, di-carboxylic, or poly-carboxylic acid may be added.

In order to promote stabilization of a CMP slurry against settling, flocculation, and decomposition, a variety of optional CMP slurry additives, such as surfactants, stabilizers, or dispersing agents can be used. Suitable surfactants include, for example, cationic surfactants, anionic surfactants, nonionic surfactants, amphoteric surfactants, fluorinated surfactants, mixtures thereof, and the like. The amount of additive such as a surfactant that may be used in the present invention should be sufficient to achieve effective stabilization of the slurry and will typically vary depending on the particular surfactant selected and the nature of the surface of the metal oxide abrasive. For example, if not enough of a selected surfactant is used, it will have little or no effect on the CMP slurry stabilization. On the other hand, too much surfactant in the CMP slurry may result in undesireable foaming and/or flocculation in the slurry and/or substantial reduction in polish rate.

It should be understood that a wide range of changes and modifications can be made to the embodiments of the invention described above. It is therefore intended that the foregoing description illustrates rather than limits this invention, and that it is the following claims, including all equivalents, which define this invention.

I claim:

1. A chemical-mechanical polishing slurry comprising abrasive particles dispersed in an aqueous medium wherein the abrasive particles are carbon black coated with a coating material, and wherein the coating material is a metal oxide, the slurry further including at least one ingredient selected from the group consisting of an oxidizing agent, a film forming agent, a stopping compound and an organic acid.

2. The chemical-mechanical polishing slurry of claim 1 wherein the coating material is selected from the group consisting of silica oxide, ceria oxide, titanium oxide, zirconium oxide, alumina oxide, and germania oxide.

3. The chemical-mechanical polishing slurry of claim 1 wherein at least 10% of the surface of the carbon black is covered with the coating material.

4. The chemical-mechanical polishing slurry of claim 1 wherein the abrasive particles are less than 10 micrometers in size.

5. The chemical mechanical polishing slurry of claim 4 wherein the abrasive particles are less than 1 micrometer in size.

6. The chemical mechanical polishing slurry of claim 1 wherein the slurry comprises from about 0.1% to about 20% (w/w) of abrasive particles.

7. The chemical-mechanical polishing slurry of claim 1 wherein the organic acid is selected from the group consisting of phosphoric acid, carbonic acid, mono-carboxylic acid, di-carboxylic acid or poly-carboxylic acid.

8. The chemical-mechanical polishing slurry of claim 1 wherein the slurry has a pH from about 1.0 to about 8.0.

* * * * *